(12) United States Patent
Naganuma

(10) Patent No.: US 7,290,947 B2
(45) Date of Patent: Nov. 6, 2007

(54) LIGHT CONTROLLER AND IMAGE PICKUP DEVICE INCLUDING THE SAME

(75) Inventor: Hiroaki Naganuma, Kofu (JP)

(73) Assignee: Nisca Corporation, Minamikoma-Gun, Yamanashi-Ken (JP)

( * ) Notice: Subject to any disclaimer, the term of this patent is extended or adjusted under 35 U.S.C. 154(b) by 302 days.

(21) Appl. No.: 11/102,738

(22) Filed: Apr. 11, 2005

(65) Prior Publication Data

US 2006/0033821 A1   Feb. 16, 2006

(30) Foreign Application Priority Data

Aug. 13, 2004   (JP) .............................. 2004-235752

(51) Int. Cl.
*G03B 9/08*   (2006.01)
*G03B 1/00*   (2006.01)

(52) U.S. Cl. ...................................... 396/453; 396/497
(58) Field of Classification Search ................ 396/453, 396/493, 497, 458, 505
See application file for complete search history.

(56) References Cited

U.S. PATENT DOCUMENTS 3,825,940 A * 7/1974 Hayami ...................... 396/479
5,255,037 A * 10/1993 Kobayashi ................... 396/459
5,678,104 A * 10/1997 Murakami ................... 396/436
6,089,760 A *  7/2000 Terada ......................... 396/463

FOREIGN PATENT DOCUMENTS

| JP | 2001-228504 | 8/2001 |
|---|---|---|
| JP | 2003-66506 | 3/2003 |
| JP | 2003-222927 | 8/2003 |

* cited by examiner

*Primary Examiner*—Christopher Mahoney
(74) *Attorney, Agent, or Firm*—Manabu Kanesaka

(57) ABSTRACT

A light controller includes a substrate having an optical path opening, a blade unit with a blade mounted on the substrate for opening and closing the optical path opening, a driver unit for driving the blade, and a stopper unit for restricting a movement of the blade between an open position and a closed position. The stopper unit includes a long hole formed in the blade and extending in a direction that the blade moves, and a stopper pin fitted into the long hole. The long hole is disposed at a position away from the optical path opening in an entire range that the blade moves. Accordingly, when the blade unit has a plurality of blades, it is necessary to arrange only the stopper pins having a number equal to the number of the blades on the substrate, thereby reducing a size of an apparatus.

6 Claims, 11 Drawing Sheets

LIGHT CONTROLLER AND IMAGE PICKUP DEVICE INCLUDING THE SAME

BACKGROUND OF THE INVENTION AND RELATED ART STATEMENT

The present invention relates to a light controller in an image pickup device such as a still camera and a digital camera, or in a projector. In particular, the present invention relates to a light controller such as a shutter provided in an optical path of an optical device for shutting off shooting light or projection light.

A light controller is generally provided on a substrate having an optical path opening at the center of a shooting optical path or projection optical path of an optical device such as a camera and a projector. One or several blades are rotatably supported by pins on the substrate, and tips of the blades face the optical path opening so as to open or close an optical path, thereby controlling an amount of light. A light controlling blade such as a shutter blade is provided on the substrate to move reciprocally within a predetermined angle between a position where the blade covers the optical opening and a position away from the opening. The blade is connected to a driver such as a motor separately mounted on the substrate with a conductor.

Japanese Patent Publications (Kokai) No. 2001-228504, No. 2003-066506, and No. 2003-222927 have disclosed conventional devices having structures shown in FIGS. 8 to 11(a) and 11(b). As shown in FIG. 8, a pair of blades SH is rotatably supported on a substrate having an optical path opening at the center thereof, and the blades SH facing each other swing in opposite directions so as to open or close the optical path opening. Conventionally, tip edges of the blades abut against projecting stopper walls integrated with the substrate, so that the movement of the blades can be limited at the open and closed positions.

As shown in FIGS. 8 and 9, a stopper wall SP1 abuts against the tip of the blade SH to limit the same at the closed position, and a stopper wall SP2 limits the tip of the blade SH at the open position. Accordingly, it is necessary to provide the stopper walls such as projections on the substrate at the open and closed positions of the blades, thereby increasing a size of the substrate. Furthermore, a single driver moves the pair of blades in two directions through a conducting lever.

When the substrate has the stopper walls at the open and closed positions where the blades opens and closes the optical path opening, it is difficult to reduce a size of the substrate and make a structure of an apparatus simple. Especially, when three or more blades are provided on the substrate to quickly open and close the optical path opening, it is necessary to provide six or more stopper walls with high precision, thereby increasing a size and making an apparatus complex.

When the tip edges of the blades abut against the stopper walls, the blades may rebound or deform. If the blades rebound upon abutting against the stopper walls, the blades may slightly open the optical path, thereby leaking light. The blades may vibrate upon rebounding, thereby causing a large influence on a shooting condition. Further, as shown in FIGS. 11(a) and 11(b), when the blades abut against the stopper walls SP1 and SP2, the blades bend to create a gap at overlapped portion, thereby leaking light. When the blades bend, the blades tend to rebound more often.

As described above, in the conventional structures, the tips of the shutter blades abut against the stopper walls at the open and closed positions. Accordingly, it is difficult to prevent light from leaking when the blades bend or rebound, and to move the blades smoothly.

In view of the problems described above, an object of the present invention is to provide a light controller in which it is possible to provide a stopper unit on a substrate to stop a blade at open and closed positions for adjusting an amount of light, and to prevent the blade from rebounding.

Another object of the present invention is to provide a light controller in which it is possible to provide a plurality of blades for quickly opening and closing without increasing a size of a stopper unit for stopping the blades at open and closed positions, and without increasing a rebounding of the blades, thereby increasing a shutter speed of an optical device such as a camera apparatus.

Further objects and advantages of the invention will be apparent from the following description of the invention.

SUMMARY OF THE INVENTION

In order to attain the objects described above, according to the present invention, a light controller includes a substrate having an optical path opening; a blade unit having a blade mounted on the substrate for opening and closing the optical path opening; a driver unit for driving the blade; and a stopper unit for restricting a movement of the blade between an open position and a closed position. The stopper unit includes a long hole formed in the blade and extending in a direction that the blade moves, and a stopper pin fitted into the long hole. The long hole is disposed at a position away from the optical path opening in an entire range that the blade moves. Accordingly, when the blade unit has a plurality of blades, it is necessary to arrange only the stopper pins having a number equal to the number of the blades on the substrate, thereby reducing a size of an apparatus.

According to the present invention, the blade unit may include three or more blades. The blades have base ends rotatably supported with shafts and uniformly disposed along a circumferential edge of the optical path opening of the substrate. The long hole and stopper pin have straight abutting surfaces at the open position and closed position. The straight abutting surface extends along a straight line inclined at a predetermined angle with respect to a straight line between the abutting surface and the shaft, thereby reducing a rebound force of the blade. The driver unit includes a plurality of electromagnetic drivers having magnet rotors. The electromagnetic drivers are mounted on the substrate for transferring a driving force to the blades. Accordingly, each of the drivers drives each of the blades to quickly open and closes the optical path opening.

According to the present invention, an image pickup device includes a lens for focusing light from a subject; an image pickup unit for picking up light from the lens; and a substrate disposed in an optical path between the subject and the image pickup unit and having an optical path opening. The substrate is provided with a blade unit having a blade mounted on the substrate for opening and closing the optical path opening; a driver unit for driving the blade; and a stopper unit for restricting a movement of the blade between an open position and a closed position. With this structure, when the blade is used as a shutter blade, it is possible to obtain a high shutter speed.

BRIEF DESCRIPTION OF THE DRAWINGS

FIGS. 5(a) and 5(b) are partially sectional views of the light controller, wherein FIG. 5(a) shows a relationship between a stopper pin and a blade in the open state, and FIG. 5(b) shows a relationship between the stopper pin and the blade in the closed state;

FIGS. 11(a) and 11(b) are partially sectional view of one of the shutter devices shown in FIGS. 8 to 10, wherein FIG. 11(a) shows an open state in which a stopper wall abuts against a blade; and FIG. 11(b) shows a closed state in which the stopper wall abuts against the blade.

DETAILED DESCRIPTION OF PREFERRED EMBODIMENTS

Figure 1:
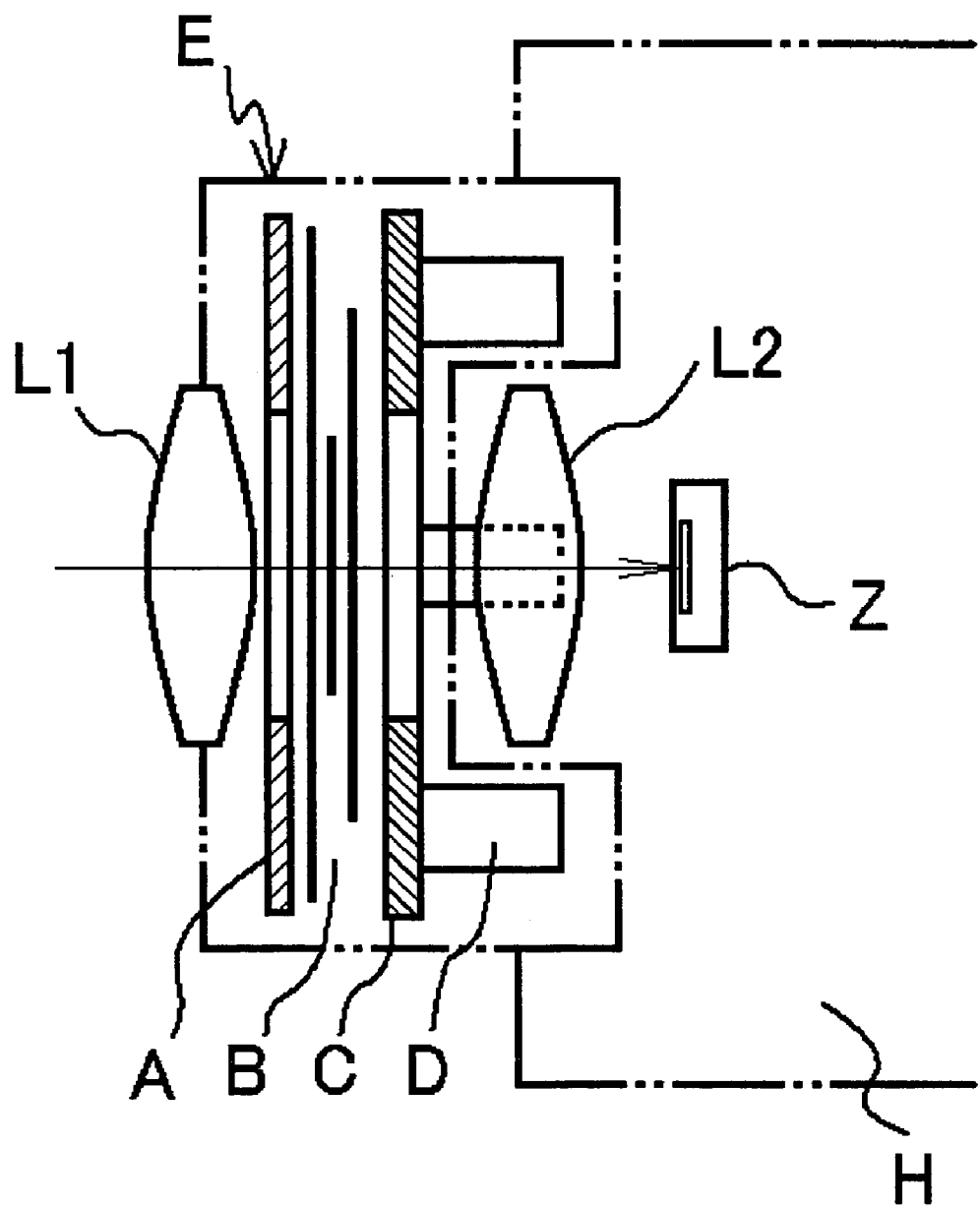
FIG. 1 is a schematic diagram of a camera including a light controller according to an embodiment of the invention.
Figure 2:
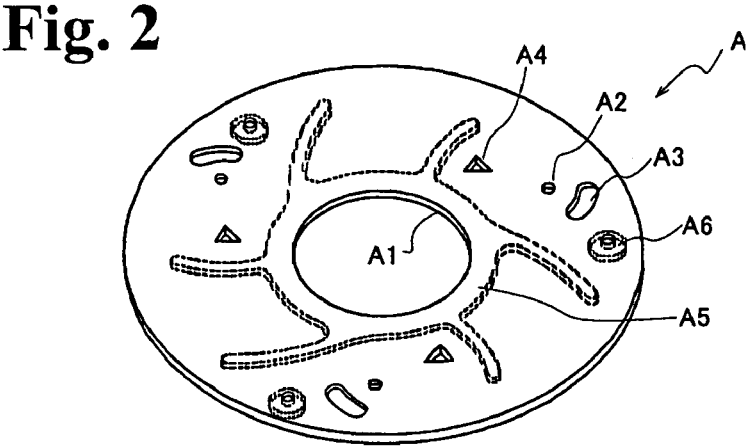
FIG. 2 is an exploded perspective view of the light controller in the apparatus in FIG. 1.
Figure 2:
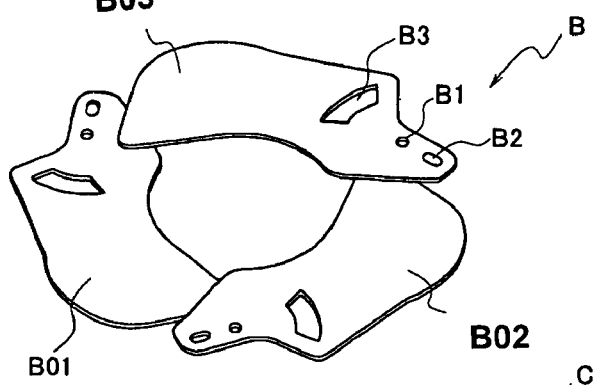
Figure 2:
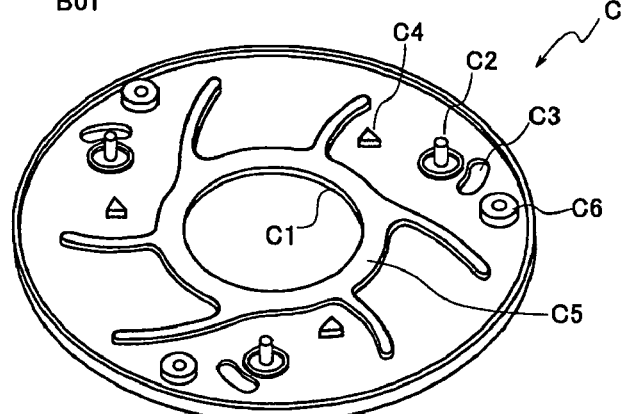
Figure 2:
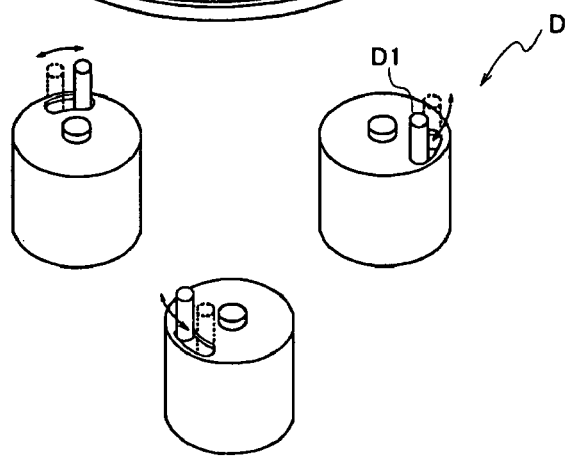
Figure 3:
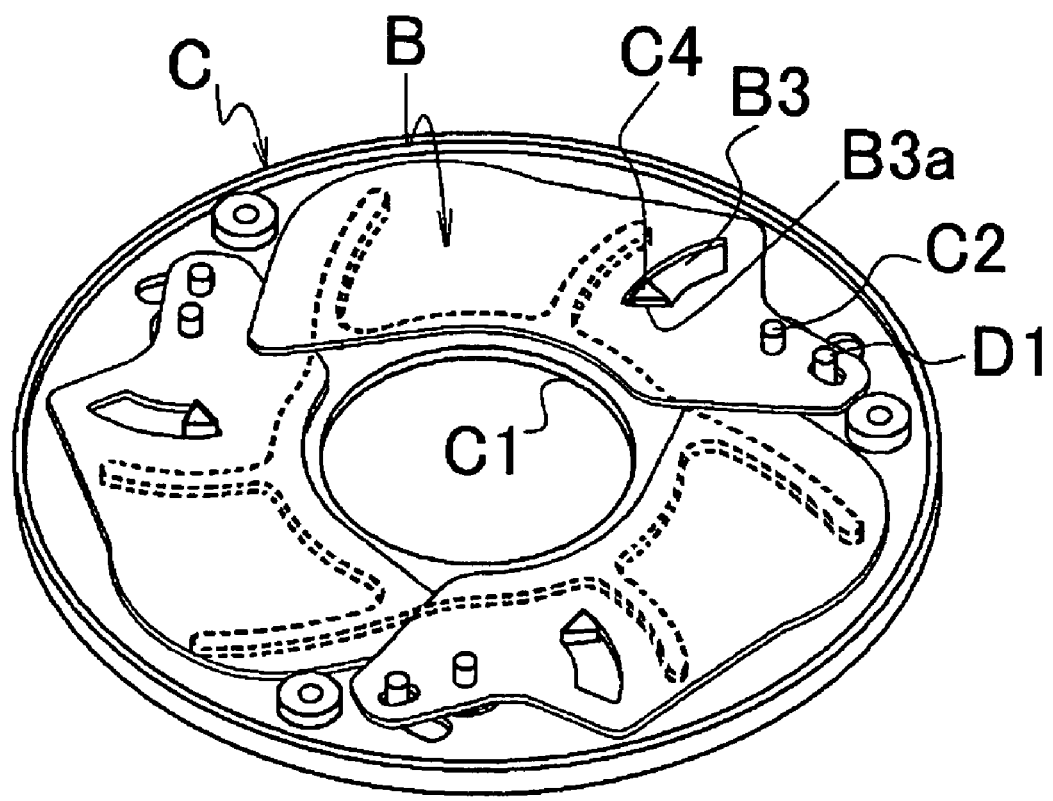
FIG. 3 is a perspective view of the light controller in an open state.
Figure 4:
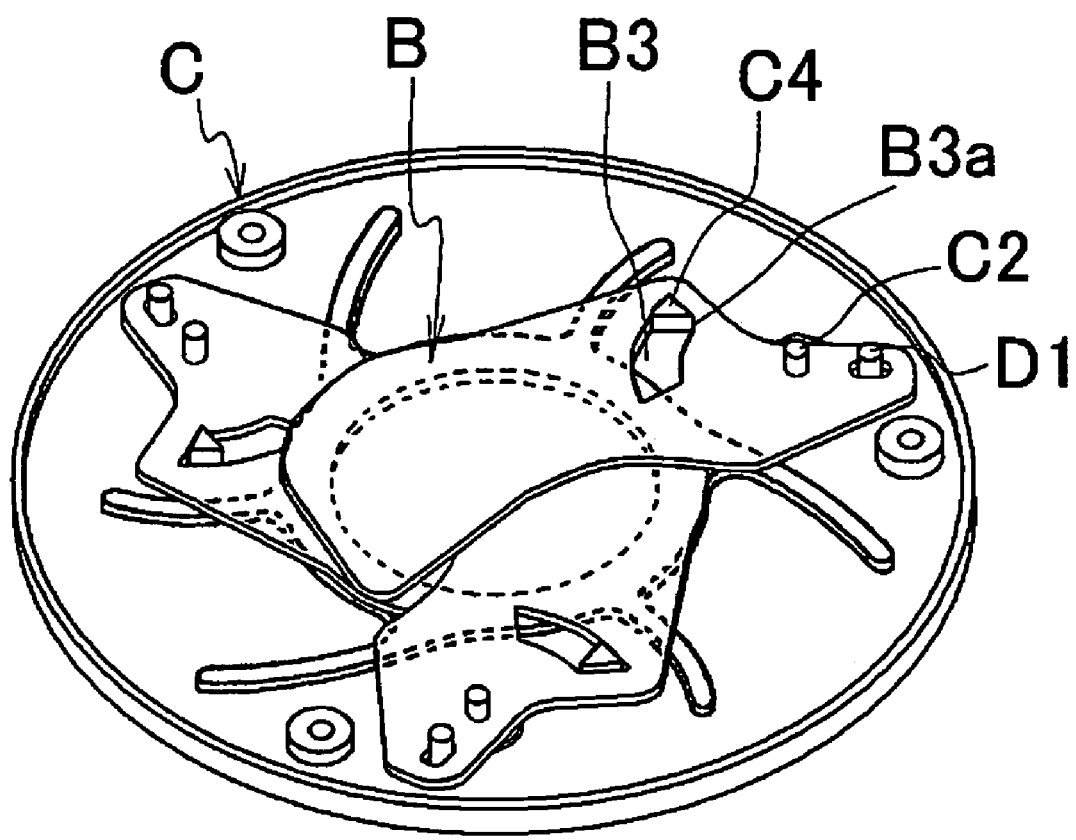
FIG. 4 is a perspective view of the light controller in a closed state.
Figure 5B:
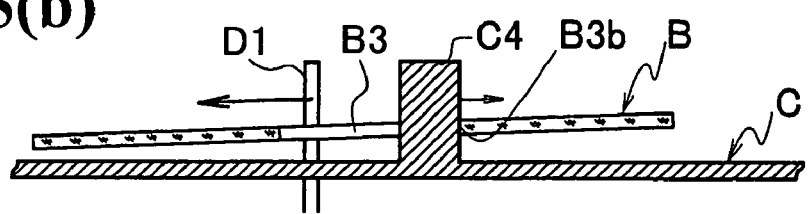
Figure 5A:
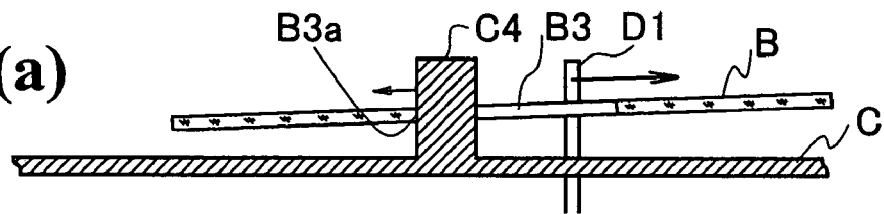

Hereunder, embodiments of the invention will be described in detail based on the accompanying drawings. FIG. 1 shows a camera including a camera light controller according to an embodiment of the invention. FIGS. 2 to 5 show the camera light-controller according to the embodiment of the invention. FIG. 2 is an exploded perspective view of the camera light controller. FIG. 3 is a perspective view of the camera light controller in the open state in which a blade unit is entirely open. FIG. 4 is a perspective view of the camera light controller in the closed state in which the blade unit is entirely closed. FIGS. 5(a) and 5(b) are explanatory diagrams of states that the blade unit abuts against a stopper unit.

The light, controller of the invention includes a substrate C having an optical axis opening C1 at the center thereof; multiple blades B01, B02 and B03 disposed on the substrate C; drivers D for opening and closing the blades B01, B02 and B03; and a retainer A for supporting the blades B01, B02 and B03 between the retainer A and the substrate C. The substrate C may be formed in a disk or other shape by, for example, molding a resin, and has the optical axis opening C1 at the center thereof. A projecting guide C5 and shafts C2 are integrated with the substrate C. The guide C5 guides blades. The shafts C2 support the blades.

The light controller has the three blades B01, B02 and B03 and the three shafts C2. The shafts C2 are spaced uniformly by 120 degrees around the optical axis opening C1. Therefore, when three or more blades are provided, the shafts having a number equal to the number of the blades are spaced uniformly. The substrate C has clearance holes C3 near the shafts C2 for inserting drive pins D1 of the driver D (described later).

Base ends of the blades B01, B02 and B03 are rotatably supported by the shafts C2, and are mounted on the substrate C. Each of the blades has a thin film formed of a synthetic resin and having a shape formed by press processing. The thin film is a light-shield film containing a black pigment. Each of the base ends of the three blades B01 to B03 has a fit-hole B1 supported by the shaft C2, so that the blades B01 to B03 can be supported about the shafts C2.

The tip edges of the blades adjacent to each other are disposed one over another. The second blade B02 is disposed over the first blade B01, and the third blade B03 is further disposed over the second blade B02. Each of the edges of the blades B01, B02 and B03 facing the optical axis opening C1 has a shape to open and close the optical axis opening C1 in the state shown in FIG. 3 (open position) in which the blades B01, B02 and B03 are away from the optical axis opening C1 and in the state in FIG. 4 (closed position) in which the blades B01, B02 and B03 close the optical axis opening C1. Each of the blades has a long hole B3 and a drive pin associating hole B2 along opening and closing directions. The holes are integrally punched in the blades. The long hole B3 has a length equal to a length from the open state (FIG. 3) in which the blade moves away from the optical axis opening C1 to the closed state (FIG. 4) in which the blade closes the opening, so that a opening/closing stroke of the blade can be defined.

The long hole B3 is disposed at a position where the blade is away from the optical axis opening C1 in the entire opening/closing range. Accordingly, it is possible to prevent external light from entering through a shooting optical path due to the long hole B3 partially positioned over the optical axis opening C1 especially when the blade is closed. The long hole B3 is positioned on the opposite side through the drive pin associating hole B2 (pin associating hole, described later), and the shaft C2.

Figure 6:
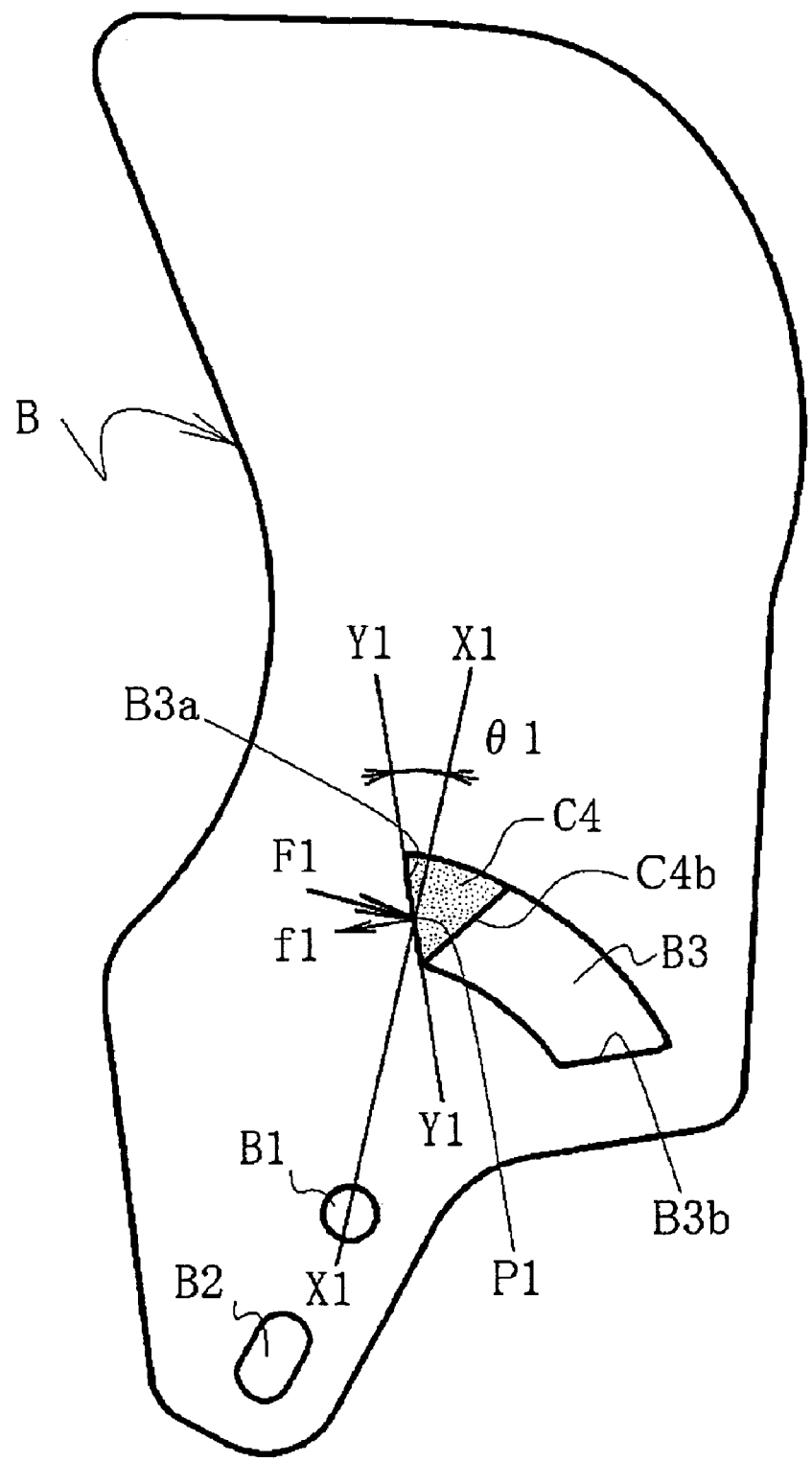
FIG. 6 is a plan view of the blade in which the blade abuts against a stopper pin when the light controller is entirely open.

Each of the blades has the long hole B3, pin associating hole B2, and the shaft C2 substantially on a straight line as shown in FIG. 6. The shaft C2 is disposed at the center between the long hole B3 and the pin associating hole B2. Thus, the pin associating hole B2 and the long hole B3 rotate about the shaft C2 in opposite directions. Each of the blades has the pin associating hole B2 in the direction orthogonal to the direction of rotation of the drive pin D1, so that the drive pin D1 of the driver D (described later) can fit into the pin associating hole B2 to rotate the blade.

Next, a construction of the drivers D will be described. The driver D has a structure including a magnet rotor having a rotational axis; an excited coil for generating rotating torque in the rotor; and a coil frame about which the coil is wound. Generally, the magnet rotor includes the rotational axis in a cylindrical permanent magnet having two poles N and S, and the rotor is rotatably accommodated within the coil frame. The coil is wound around the outer circumference of the coil frame, and the outer circumference is covered by a yoke. A drive arm is integrally mounted to the rotational axis of the rotor, and the tip of the drive arm has a drive pin D1.

With this construction, when a current in the normal direction is supplied to the excited coil, the drive pin D1 in the magnet rotor rotates in a predetermined direction. When a current in the reverse direction is supplied to the excited coil, the drive pin D1 rotates in the reverse direction by a predetermined angle. In other words, the normal and reverse current supplied to the excited coil rotates the drive pin D1 by a predetermined angle within 90 degrees. The drive pin D1 is fitted (inserted) into the pin associating hole B2 in the blade through the clearance hole C3 in the substrate C. In the figures, the drivers D having a number equal to the number (three in the embodiment) of the blades are mounted to the substrate C.

As described above, the three blades B01, B02 and B03 are rotatably mounted around the optical axis opening C1 in the substrate C, and the drive pins D1 of the drivers D mounted on the back of the substrate C are fitted into and connected to the pin associating holes B2, so that the blades can rotate by a predetermined angle. The retainer A is attached to the substrate C. The retainer A is spaced from the substrate C with a predetermined space in between, and the blades B01, B02 and B03 are rotatably supported between the retainer A and the substrate C.

The retainer A has openings A1; clearance holes A2 for the shafts C2; slit holes A3; clearance holes A4 for the stopper pins C4; a guide rib A5; and screw holes A6. The opening A1 has a diameter slightly larger than that of the optical axis (light-exposure) opening C1 in the substrate C. Each of the (slit-like) long holes A3 is at a position corresponding to each of the clearance holes C3. The guide rib A5 faces the guide C5. The screw holes A6 are used for screwing the retainer A to fixing portions C6 of the substrate C.

A stopper unit is formed of the long holes B3 in the blades B01, B02 and B03 and the stopper pins C4 on the substrate C. The projecting stopper pins C4 are disposed on the substrate C at positions corresponding to the long holes B3 in the blades. The stopper pins C4 are integrally formed when the substrate C is molded. Each of the stopper pins C4 and each of long holes B3 have shapes shown in FIGS. 6 and 7.

Each of the stopper pins C4 has a straight abutting surface abutting (Y1-Y1 in FIG. 6 and Y2-Y2 in FIG. 7) against both ends B3*a* and B3*b* of each of the long holes B3 fitting to the stopper pin C4. In other words, each of the long holes B3 has a fan shape having the straight end faces B3*a* and B3*b*. Each of the stopper pins C4 has a triangular or trapezoidal section having straight abutting surfaces C4*a* and C4*b*.

FIG. 6 shows a relationship between the stopper pin C4 and the long hole B3 where a blade unit B is entirely opened (open position). The abutting surface C4*a* of the stopper pin C4 and the abutting surface B3*a* of the long hole B3 form the straight line Y1-Y1 at the open position. The straight line Y1-Y1 is inclined at a predetermined angle ($\theta 1$) with respect to a straight line X1-X1 connecting the abutting surface C4*a* to the fit hole B1 for the shaft C2. In this state, a rotational force of the blade acts on a point P1 on the abutting surface C4*a* as a force F1, and collides with the stopper pin C4. A rebound force of the force F1 reaches the straight line Y1-Y1 of the abutting surface C4*a* as a rebound force f1. The rebound force f1 is given by $f1=F1 \cdot \cos\theta 1$, and decreases as the angle $\theta 1$ increases due to the tilt angle $\theta 1$.

Figure 7:
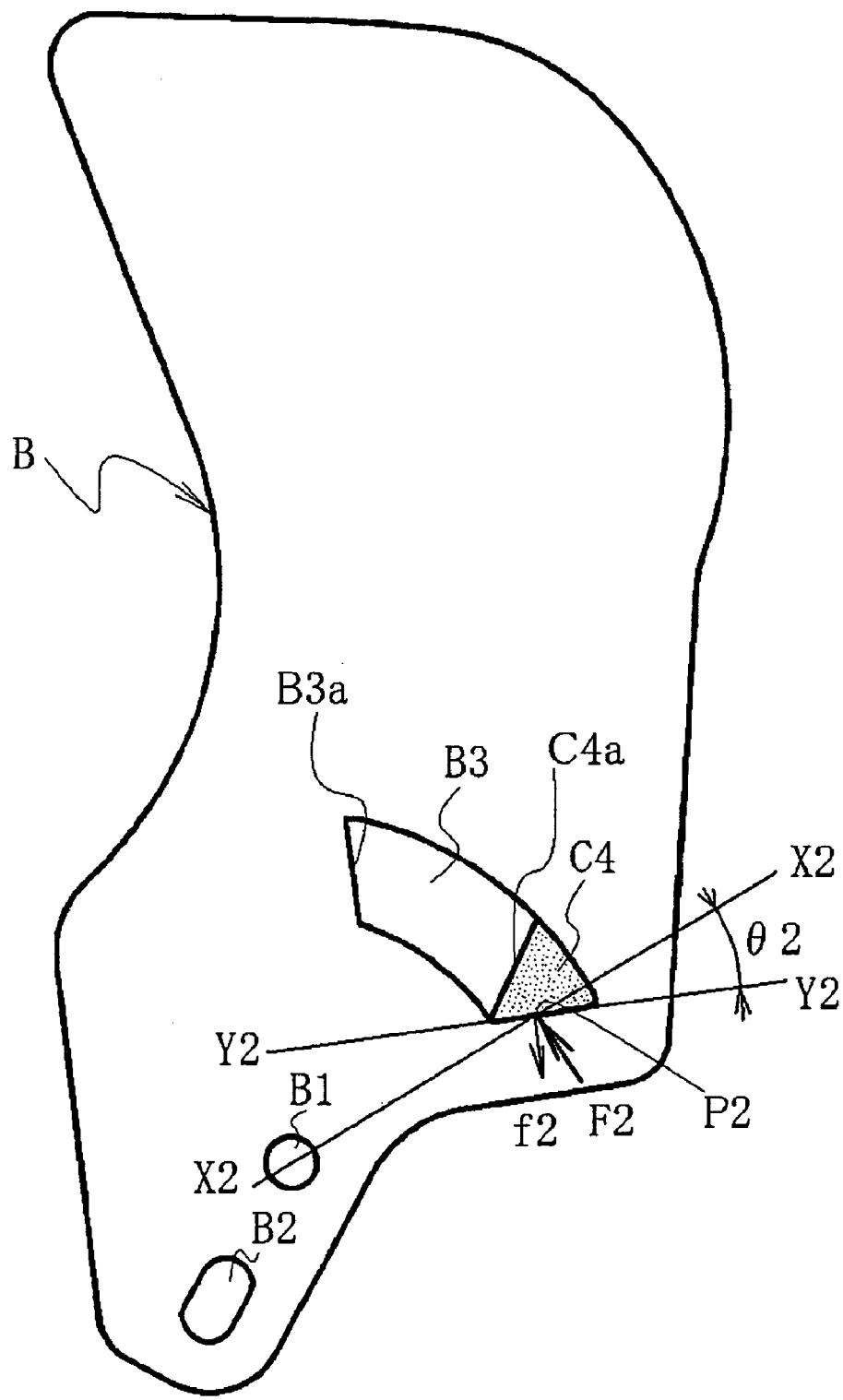
FIG. 7 is a plan view of the blade in which the blade abuts against the stopper pin when the light controller is entirely closed.
Figure 8:
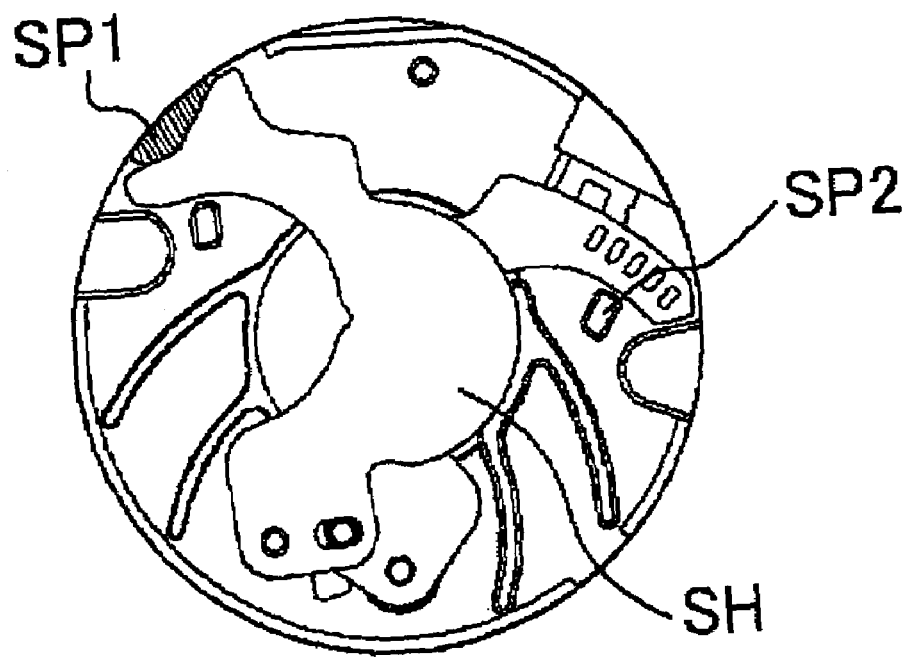
FIG. 8 is a plan view of a conventional shutter device.
Figure 9:
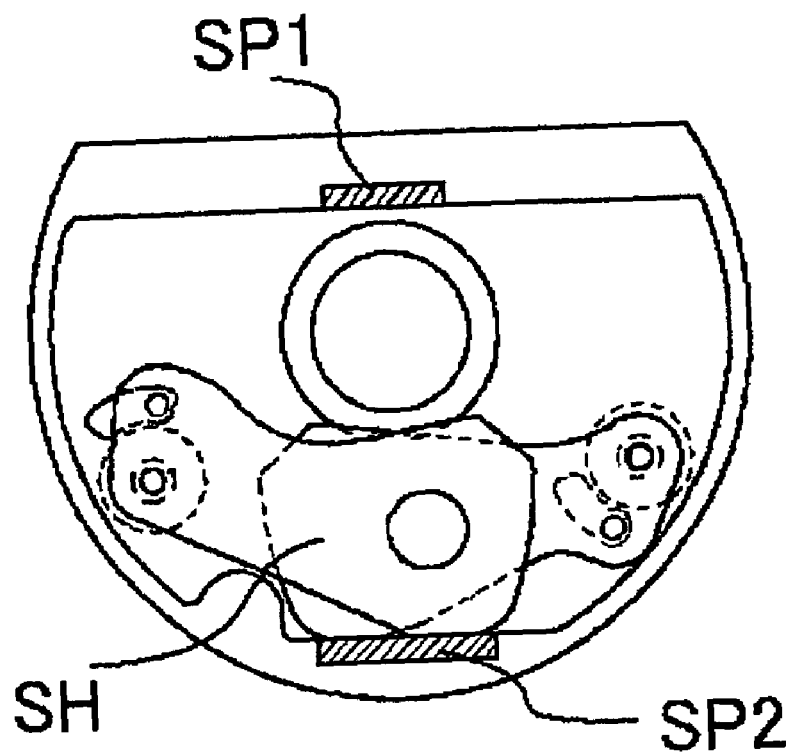
FIG. 9 is a plan view of another conventional shutter device.
Figure 10:
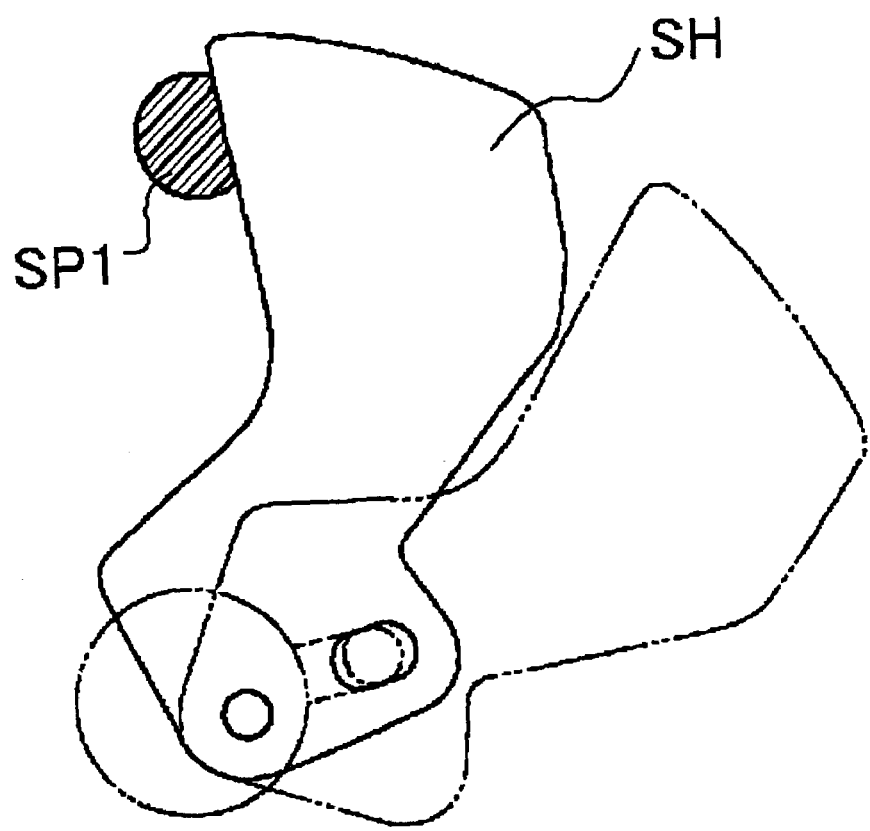
FIG. 10 is a plan view of a further conventional shutter device.
Figure 11A:
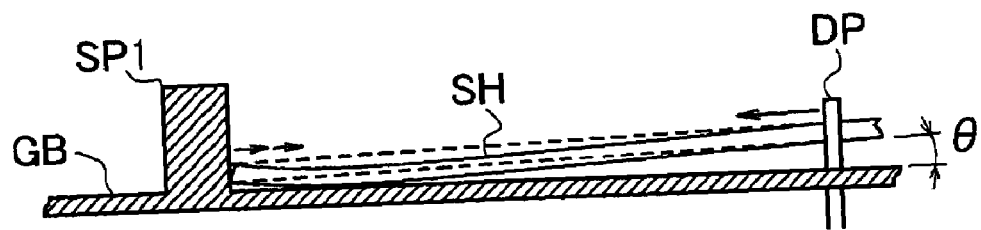
Figure 11B:
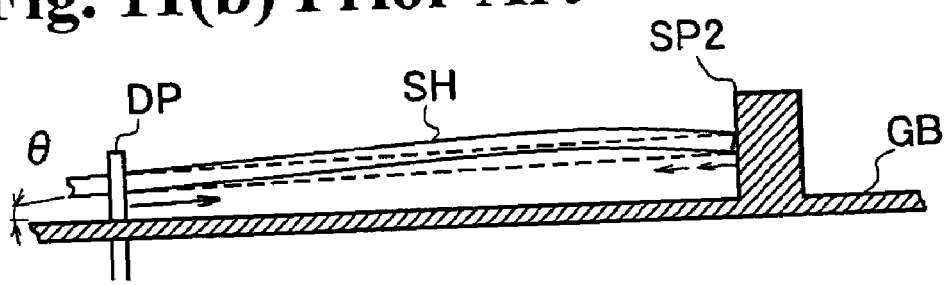

At the closed position of the blade in FIG. 7, the rebound force f2 is given by $f2=F2 \cdot \cos\theta 2$, and decreases as the angle $\theta 2$ increases. In other words, the straight line Y2-Y2 formed by the abutting surface C4*b* of the stopper pin C4 and the abutting surface B3*b* of the long hole B3 and the straight line X2-X2 connecting the contact P2 and the fit hole B1 intersect to form the angle $\theta 2$. The contacts P1 and P2 only need to create the angles $\theta 1$ and $\theta 2$ continuously in a certain length, and the stopper pin C4 and long hole B3 do not have to abut against each other in the entire length as shown in FIGS. 6 and 7.

When the abutting surface B3*b* of the long hole B3, which is a fan-shaped slit hole, abuts against the stopper pin C4 on the substrate C where the blade unit B shown in FIG. 4 is entirely closed, the detent torque rotationally urges the drive pins D1 of the drivers D connected to the blade unit B about the shafts C2 in a counterclockwise direction, so that the blade unit B can be retained at the position. The detent force of the drivers D also acts so as to rotationally urge the drive pins D1 about the shafts C2 in a clockwise direction even where the blade unit B shown in FIG. 3 is entirely open. Against the detent torque of the drivers D, soft magnetic pins, for example, may be implanted on the substrate at positions where the magnet poles of the magnet rotors are attracted. Alternatively, an energizer such as a closed coil spring may be used.

Next, an image pickup device such as a camera including the light controller will be described with reference to FIG. 1. FIG. 1 includes a lens barrel unit E of the camera including an imaging lens and a camera body H. Shooting light from a subject is guided to the lens barrel unit E and forms an image on a light gathering lens L2 within the lens barrel unit E. The image is recorded by an image pickup unit Z (such as a CCD and a light-sensitive film) disposed at the imaging position. The light controller is built within the lens barrel unit E such that subject light in the lens barrel unit E at the process can be properly exposure-controlled, captured, and shot by the image pickup unit Z. FIG. 1 includes an objective lens L1 for guiding subject light to the capture imaging lens L2. The light controller adjusts a diameter and a size of the lens barrel unit E.

Next, an operation of the light controller by using a photoelectric sensor (CCD) as an image pickup device will be described.

Referring to FIG. 1, when a power supply of the camera body H is turned on, a monitor and an exposure controller circuit (not shown) are operated to display a subject on the monitor. When a photographer starts shooting, the exposure controller circuit operates to control three drivers D to obtain proper light exposure in an interlocking manner. The drive pins D1 drive the blades B in the direction for opening the exposure opening in synchronization. At the same time, after charges corresponding to an old image remaining in the image pickup unit Z are reset once and then cleared, capturing a new image is started.

After a predetermined exposure time, the abutting surfaces B3*b* of the long holes B3 of the blades B abut against the stopper pins C4 by the driving of the drive pins D1, so that the light controller at the open state shown in FIG. 3 is switched to the entirely closed state shown in FIG. 4. After a proper time after the light controller is changed to the entirely closed state, image data captured by the image pickup unit Z is recorded in a storage unit (not shown) as one image. Then, the drive pins D1 of the drivers D are rotated in the reverse direction to the open state in FIG. 3, and the abutting surfaces B3*a* of the long holes B3 of the blades B abut against the stopper pins C4 to keep the open position. Thus, the monitor captures the subject again, and the preparation for the next shooting is completed.

When the power supply of the camera body H in the apparatus in FIG. 1 is turned on, the controller circuit operates, and the blade unit B is maintained at the entirely open state (the state in FIG. 3). When the controller circuit determines the closed state of the blade unit B based on the charge state of the CCD, for example, either positive or negative current is supplied to the excited coils, whereby the blade unit B is moved to the open position. When the blade unit B is entirely open, light from a subject is irradiated on the CCD, and an output from the CCD is projected onto the monitor screen.

When a user performs a release operation subsequently, charges integrated in the CCD are discharged to reset, and the CCD moves to a shooting operation. At this time, a program for a shutter operation built in the controller circuit is executed, and a predetermined shooting time is measured by counting clocks of the CPU, for example. After a predefined shooting time, the controller circuit supplies a predetermined amount of current to the excited coils of the drivers D.

The passage of the current through the excited coils rotates the drive pins D1 of the drivers D in the clockwise direction in FIG. 3, and the tips of the blades B rotate in the counterclockwise direction about the shafts C2. The three blades B01, B02 and B03 driven independently overlap one another, whereby the optical axis opening C1 is closed. The shooting operation ends with the state in FIG. 4 in which the blade unit B closes the optical axis opening C1, and the charges integrated in the CCD are output and saved in the memory.

When the blade unit B includes three or more blades, the opening/closing stroke is shorter than that of one or two blades at the process. Thus, the blade unit B can rapidly (quickly) move from the open state to the closed state. Since the driver D is provided in each of the blades, the force can be transferred more rapidly than the force from one driver branched off to the blades. Thus, the blade unit B can implement a rapid opening/closing movement, which can greatly increase the shutter speed more than that of a conventional apparatus. In this case, providing multiple blades each having a driver in the light controller may increase the size of the light controller. Furthermore, the rebounds caused when the blades abut against the stopper units become significant.

The above-described construction solves these problems as follows. In the blade unit B, the stopper unit includes the long hole B3 in each of the blades and the stopper pin C4 fitting into thereto. Accordingly, the space and construction can be simpler than those of a conventional one in which the tip of the blade abuts against projecting stopper walls at open and closed positions, which can reduce the size of the light controller, especially, the size of the substrate.

The long hole B3 and the stopper pin C4 have the straight abutting surfaces at the open and closed positions, and the straight line of the abutting surface is tilted at a predetermined angle with respect to the straight line directing to the shaft. Thus, the rebound force caused in the blade can be reduced. Furthermore, the long hole B3, fit hole B1 for the shaft C2, and pin associating hole B2 have a positional relationship for each of the blades B that the pin associating hole B2 and the long hole B3 are disposed on the blade base end side and blade center side about the shaft C2. The blade B has the pin associating hole B2 for the shaft C2 on the base end side and the long hole B3 in the blade center part, and the tip of the blade faces the optical axis opening C1. Accordingly, the function parts are disposed from the base end to the tip of the blade B in series. Therefore, the size of the blade and effect of the slit, for example, can be decreased, which makes the light controller robust.

As shown in FIGS. 5(a) and 5(b), each of the blades B is subject to the largest stress at the open position and closed position where a force from the drive pin D1 and a drag of the stopper pin C4 act on. Both of the forces acting on the blade at the open position in FIG. 5(a) and the closed position in FIG. 5(b) act in opposite directions near the shaft C2. Accordingly, the force causing the blade to become crinkled does not act thereon, which does not deform the blade.

According to the invention, the movement of the blade is limited at the open and closed positions with the long hole in the blade and the stopper pin fitting to the long hole. Accordingly, the opening/closing can be limited with the one stopper pin for the one blade controlling an amount of light. Therefore, the substrate can be smaller and more compact than that of the conventional case that a tip edge of a blade is stopped by stopper walls at the open and closed positions, thereby reducing the size of the light controller.

In order to form the straight abutting surface at the open position and closed position, the long hole of each of the blades and the stopper pin may have a fan-shape and a square shape, respectively. Furthermore, the straight line formed by the abutting surface is tilted to intersect with the line connecting the shaft of the blade at a predetermined angle, so that the rebound force caused in the blade can be reduced. Accordingly, it is possible to reduce the rebounds of the movement limits at the open and closed positions of each of the blades with the small and simple mechanism. Further, three or more blades can reduce the opening/closing stroke and can be opened/closed rapidly. Further, the driver provided in each of the multiple blades allows rapid opening/closing thereof, which can achieve a rapid shutter speed of a camera apparatus.

The disclosure of Japanese Patent Application No. 2004-235752, filed on Aug. 13, 2004, is incorporated in the application.

While the invention has been explained with reference to the specific embodiments of the invention, the explanation is illustrative and the invention is limited only by the appended claims.

What is claimed is:

1. A light controller, comprising:
   a substrate having an optical path opening,
   at least one blade mounted on the substrate for opening and closing the optical path opening,
   at least one driver for driving the at least one blade, and
   at least one stopper for restricting a movement of the at least one blade between an open position and a closed position and preventing the blade from rebounding, said at least one stopper having a long hole formed in the at least one blade and extending in a direction that the at least one blade moves, and a stopper pin for fitting into the long hole,
   wherein said at least one blade includes a base end rotatably supported on the substrate by a shaft, said long hole and stopper pin having straight abutting surfaces abutting against each other at the open position and closed position, each of said straight abutting surfaces being inclined at a predetermined angle relative to a straight line between each of the abutting surfaces and the shaft.

2. A light controller according to claim 1, wherein said long hole is disposed at a position away from the optical path opening in a range that the at least one blade moves.

3. A light controller, comprising:
   a substrate having an optical path opening,
   at least one blade mounted on the substrate for opening and closing the optical path opening,
   at least one driver for driving the at least one blade, and
   at least one stopper for restricting a movement of the at least one blade between an open position and a closed position, said at least one stopper having a long hole formed in the at least one blade and extending in a direction that the at least one blade moves, and a stopper pin for fitting into the long hole,
   wherein more than three blades are uniformly disposed on the substrate along a circumferential edge of the optical path opening, said driver being formed of an electromagnetic driver having a magnet rotor and arranged to correspond to each blade.

4. An image pickup device comprising a lens for focusing light from a subject, an image pickup unit for picking up light from the lens, and the light controller according to claim 1 and disposed between the lens and the image pickup unit.

5. A light controller according to claim 1, wherein said long hole of the stopper has a fan-shape; and said stopper pin has a triangle-shape and includes an arc shape side edge, facing one side of the long hole, for fitting into and sliding along the long hole and two straight side edges abutting against the abutting surfaces of the long hole at the open position and the closed position.

6. A light controller according to claim 5, wherein said at least one blade further includes a drive pin associating hole for engaging a drive pin of the driver, and a fit hole situated between the long hole and the drive pin associating hole, for receiving the shaft.

* * * * *